(12) United States Patent
Sa et al.

(10) Patent No.: US 11,308,173 B2
(45) Date of Patent: Apr. 19, 2022

(54) SEARCHING FOR IDEOGRAMS IN AN ONLINE SOCIAL NETWORK

(71) Applicant: Meta Platforms, Inc., Menlo Park, CA (US)

(72) Inventors: Brian Paihan Sa, Irvine, CA (US); Stephen Moore Davis, San Francisco, CA (US); Nikola Vilimonovic, San Francisco, CA (US); Jireh Yiwei Tan, San Francisco, CA (US); Aaron Payne Goldsmid, San Francisco, CA (US)

(73) Assignee: Meta Platforms, Inc., Menlo Park, CA (US)

(*) Notice: Subject to any disclaimer, the term of this patent is extended or adjusted under 35 U.S.C. 154(b) by 412 days.

(21) Appl. No.: 16/145,760

(22) Filed: Sep. 28, 2018

(65) Prior Publication Data
US 2019/0034545 A1    Jan. 31, 2019

Related U.S. Application Data

(63) Continuation of application No. 15/642,166, filed on Jul. 5, 2017, now Pat. No. 10,102,295, which is a continuation of application No. 14/576,926, filed on Dec. 19, 2014, now Pat. No. 9,721,024.

(51) Int. Cl.
*G06F 16/00* (2019.01)
*G06F 16/9535* (2019.01)
*G06F 16/33* (2019.01)

(52) U.S. Cl.
CPC ...... *G06F 16/9535* (2019.01); *G06F 16/3346* (2019.01)

(58) Field of Classification Search
CPC ............ G06F 16/9535; G06F 16/3346; G06F 16/24578; G06F 16/951
See application file for complete search history.

(56) References Cited

U.S. PATENT DOCUMENTS

| | | | |
|---|---|---|---|
| 5,388,196 A | 2/1995 | Pajak | |
| 5,987,454 A | 11/1999 | Hobbs | |
| 6,640,278 B1 * | 10/2003 | Nolan | G06F 3/0601 707/999.001 |
| 7,797,629 B2 * | 9/2010 | Fux | G06F 40/274 715/257 |
| 8,166,026 B1 | 4/2012 | Sadler | |
| 8,255,810 B2 * | 8/2012 | Moore | G06F 3/04817 715/752 |
| 8,782,080 B2 * | 7/2014 | Lee | G06F 16/2457 707/771 |
| 8,799,028 B1 | 8/2014 | Warden | |

(Continued)

*Primary Examiner* — Noosha Arjomandi
(74) *Attorney, Agent, or Firm* — Baker Botts L.L.P.

(57) ABSTRACT

In one embodiment, a method includes receiving a first query comprising one or more n-grams inputted by the first user at the client system, accessing by the client system a plurality of ideograms each being associated with one or more tags matching at least one of the n-grams of the first query, where the one or more ideograms are ranked in an order based on their respective user-probabilities each being calculated based at least in part on a frequency of use associated with the respective ideogram, presenting one or more of the ideograms at the client system in ranked order where each ideogram is selectable by the first user, and receiving a selection of one of the presented ideograms at the client system.

20 Claims, 10 Drawing Sheets

(56) References Cited

U.S. PATENT DOCUMENTS

| | | | |
|---|---|---|---|
| 9,047,283 B1 | 6/2015 | Zhang | |
| 9,679,024 B2* | 6/2017 | Hegerty | G06F 16/9535 |
| 9,928,484 B2* | 3/2018 | Deeter | G06Q 10/10 |
| 10,037,437 B1* | 7/2018 | Kenthapadi | G06N 20/00 |
| 10,783,576 B1* | 9/2020 | Van Os | G06F 21/31 |
| 2005/0071864 A1* | 3/2005 | Denoue | G06F 3/0481 |
| | | | 725/9 |
| 2005/0234565 A1* | 10/2005 | Marks | G05B 19/409 |
| | | | 700/61 |
| 2006/0106769 A1* | 5/2006 | Gibbs | G06F 16/951 |
| 2006/0206675 A1* | 9/2006 | Sato | G06F 3/0647 |
| | | | 711/161 |
| 2007/0021956 A1* | 1/2007 | Qu | G06F 40/263 |
| | | | 704/8 |
| 2007/0174429 A1* | 7/2007 | Mazzaferri | H04L 67/02 |
| | | | 709/218 |
| 2007/0180450 A1* | 8/2007 | Croft | G06F 9/5077 |
| | | | 718/1 |
| 2008/0141117 A1 | 6/2008 | King | |
| 2008/0312909 A1* | 12/2008 | Hermansen | G06F 16/33 |
| | | | 704/9 |
| 2009/0054092 A1* | 2/2009 | Stonefield | H04L 51/24 |
| | | | 455/466 |
| 2009/0055168 A1* | 2/2009 | Wu | G06F 40/129 |
| | | | 704/10 |
| 2009/0055381 A1* | 2/2009 | Wu | G06F 40/258 |
| 2009/0202336 A1* | 8/2009 | Shah | G05B 19/41815 |
| | | | 414/806 |
| 2010/0125785 A1* | 5/2010 | Moore | G06F 3/0482 |
| | | | 715/702 |
| 2010/0177116 A1* | 7/2010 | Dahllof | H04M 1/72436 |
| | | | 345/619 |
| 2010/0293473 A1* | 11/2010 | Borst | H04L 12/1827 |
| | | | 715/741 |
| 2011/0153641 A1 | 6/2011 | Thorup | |
| 2011/0294525 A1* | 12/2011 | Jonsson | G06F 40/20 |
| | | | 455/466 |
| 2012/0016663 A1* | 1/2012 | Gillam | G06F 16/90344 |
| | | | 704/9 |
| 2012/0019446 A1* | 1/2012 | Wu | G06F 3/0237 |
| | | | 345/168 |
| 2012/0029910 A1* | 2/2012 | Medlock | G06F 3/0482 |
| | | | 704/9 |
| 2012/0041937 A1* | 2/2012 | Dhillon | G06F 16/36 |
| | | | 707/708 |
| 2012/0290950 A1 | 11/2012 | Rapaport | |
| 2012/0311032 A1* | 12/2012 | Murphy | A63F 13/21 |
| | | | 709/204 |
| 2013/0018837 A1 | 1/2013 | Lee | |
| 2013/0124538 A1 | 5/2013 | Lee | |
| 2013/0144592 A1* | 6/2013 | Och | G06F 40/40 |
| | | | 704/2 |
| 2013/0159220 A1* | 6/2013 | Winn | G06Q 10/10 |
| | | | 706/12 |
| 2013/0307781 A1* | 11/2013 | Ghassabian | G06F 3/0487 |
| | | | 345/168 |
| 2014/0040246 A1* | 2/2014 | Rubinstein | G06F 16/24578 |
| | | | 707/722 |
| 2014/0095150 A1 | 4/2014 | Berjikly | |
| 2014/0214398 A1* | 7/2014 | Sanders | G06F 40/53 |
| | | | 704/3 |
| 2014/0358906 A1* | 12/2014 | Behzadi | G06F 16/3322 |
| | | | 707/723 |
| 2015/0056972 A1* | 2/2015 | Bartlett | H04W 4/02 |
| | | | 455/418 |
| 2015/0100537 A1* | 4/2015 | Grieves | G06F 3/0236 |
| | | | 706/52 |
| 2015/0120282 A1 | 4/2015 | Beaumont | |
| 2015/0127753 A1 | 5/2015 | Tew | |
| 2015/0169212 A1 | 6/2015 | Chang | |
| 2015/0220774 A1* | 8/2015 | Ebersman | G06F 3/011 |
| | | | 382/118 |
| 2015/0222617 A1* | 8/2015 | Ebersman | G06F 40/169 |
| | | | 726/4 |
| 2015/0286371 A1 | 10/2015 | Degani | G06Q 30/0276 |
| | | | 705/14.64 |
| 2015/0317069 A1* | 11/2015 | Clements | G06F 3/0237 |
| | | | 715/773 |
| 2015/0341406 A1* | 11/2015 | Rockefeller | H04L 67/10 |
| | | | 709/219 |
| 2016/0072902 A1 | 3/2016 | Chakra | |
| 2016/0155063 A1 | 6/2016 | Rich | |
| 2016/0179967 A1* | 6/2016 | Sa | G06F 16/3346 |
| | | | 707/730 |
| 2017/0177589 A1 | 6/2017 | Shorman | |
| 2017/0308292 A1* | 10/2017 | Choi | G06F 3/0237 |
| 2018/0359199 A1* | 12/2018 | Nguyen | H04L 51/02 |
| 2019/0034545 A1* | 1/2019 | Sa | G06F 16/3346 |

\* cited by examiner

SEARCHING FOR IDEOGRAMS IN AN ONLINE SOCIAL NETWORK

PRIORITY

This application is a continuation under 35 U.S.C. § 120 of U.S. patent application Ser. No. 15/642,166, filed 5 Jul. 2017, which is a continuation under 35 U.S.C. § 120 of U.S. patent application Ser. No. 14/576,926, filed 19 Dec. 2014, issued as U.S. Pat. No. 9,721,024.

TECHNICAL FIELD

This disclosure generally relates to presentation of content on a computing device, particularly within the context of an online social network.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

In particular embodiments, a messaging platform may generate a set of ideograms suggestions for a particular user. These suggested ideograms may be generated, for example, in response to a user-inputted query. A user may input a query at an interface displayed on the user's client system, for example, an interface of a messaging platform or a social-networking system. By generating and sending suggested ideograms to users, the messaging platform may provide a way for users to quickly find and insert nuanced ideograms into, for example, a messaging conversation with another user, or a post to a social-networking system.

In particular embodiments, the messaging platform may generate a set of ideogram suggestions using a tag-based analysis of the inputted-query. The inputted-query may be parsed using natural-language processing to identify n-grams making up the query, and the n-grams may be matched to (or otherwise associated with) tags. Each tag may also be associated with one or more ideograms. A set of suggested ideograms may be identified from among the available ideograms (e.g., ideograms owned by or otherwise accessible to the user). Ideograms may be dynamically mapped to or otherwise associated with tags based on machine-learning. The messaging platform may determine a set of suggested ideograms, and each ideogram in the set of suggested ideograms may be associated with one or more tags that match n-grams of the query. In this manner, queries may be mapped to ideograms based on associations with tags matching all or part of the query.

In particular embodiments, the ideogram suggestions may be displayed to the user on an interface of a messaging platform or social-networking system running on a user system. The user may select one or more ideograms from the set of suggested ideograms, and the selected ideogram may, for example, be sent as a message to another user over the messaging platform or posted as a status update to a social-networking system.

In particular embodiments, the set of suggested ideograms may be ranked and presented as an ordered list, the order based on the rankings determined for each suggested ideogram. The rankings may be determined based on a frequency of use of the ideogram, with respect to the individual user or a plurality of other users. The set of suggested ideograms may, for example, be ranked based on attributes or preferences of a querying user or the querying user's social connections in an online social network.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

System Overview.

Figure 1:
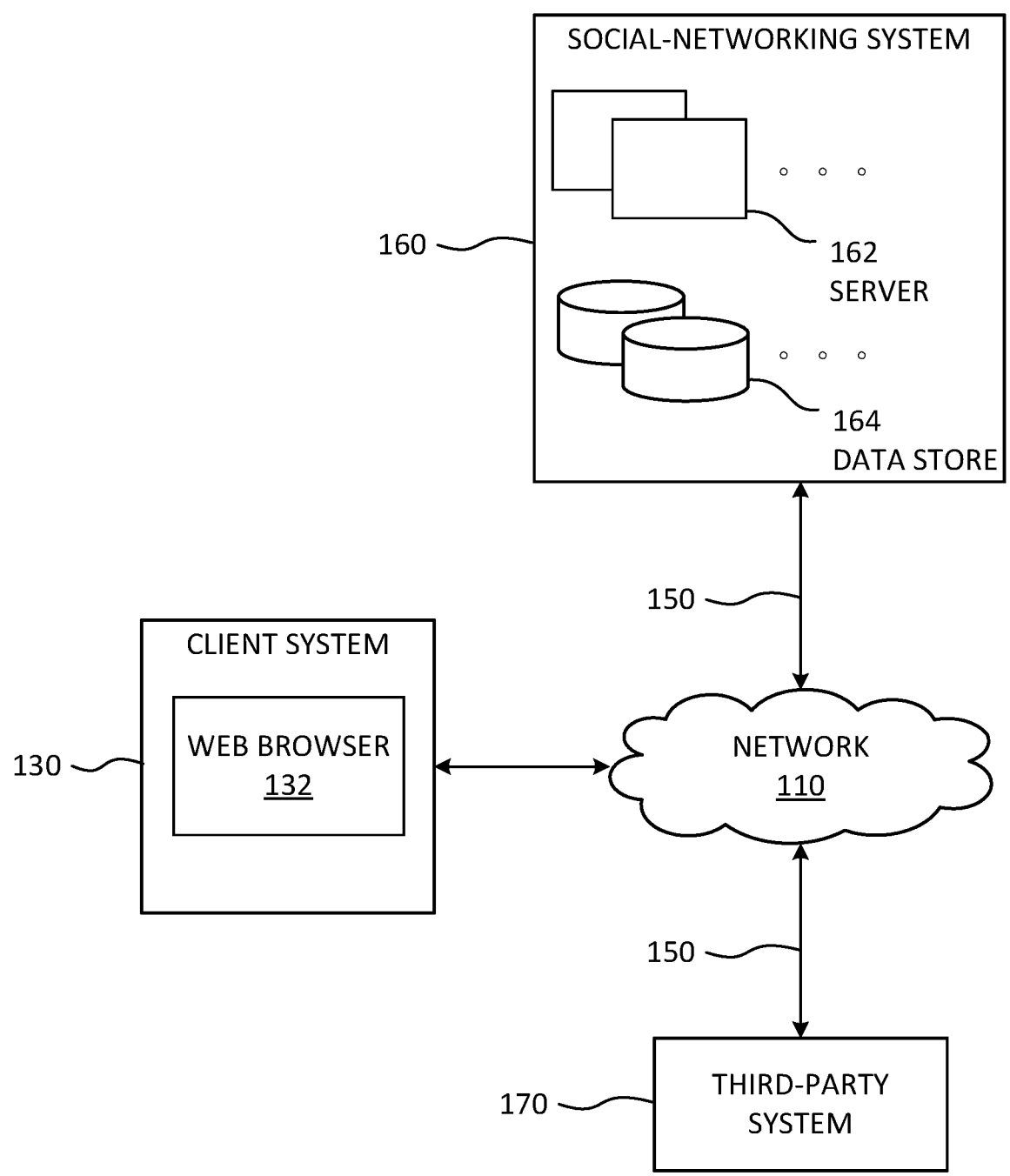
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 to whom they want to be connected. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., with which servers may communicate. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
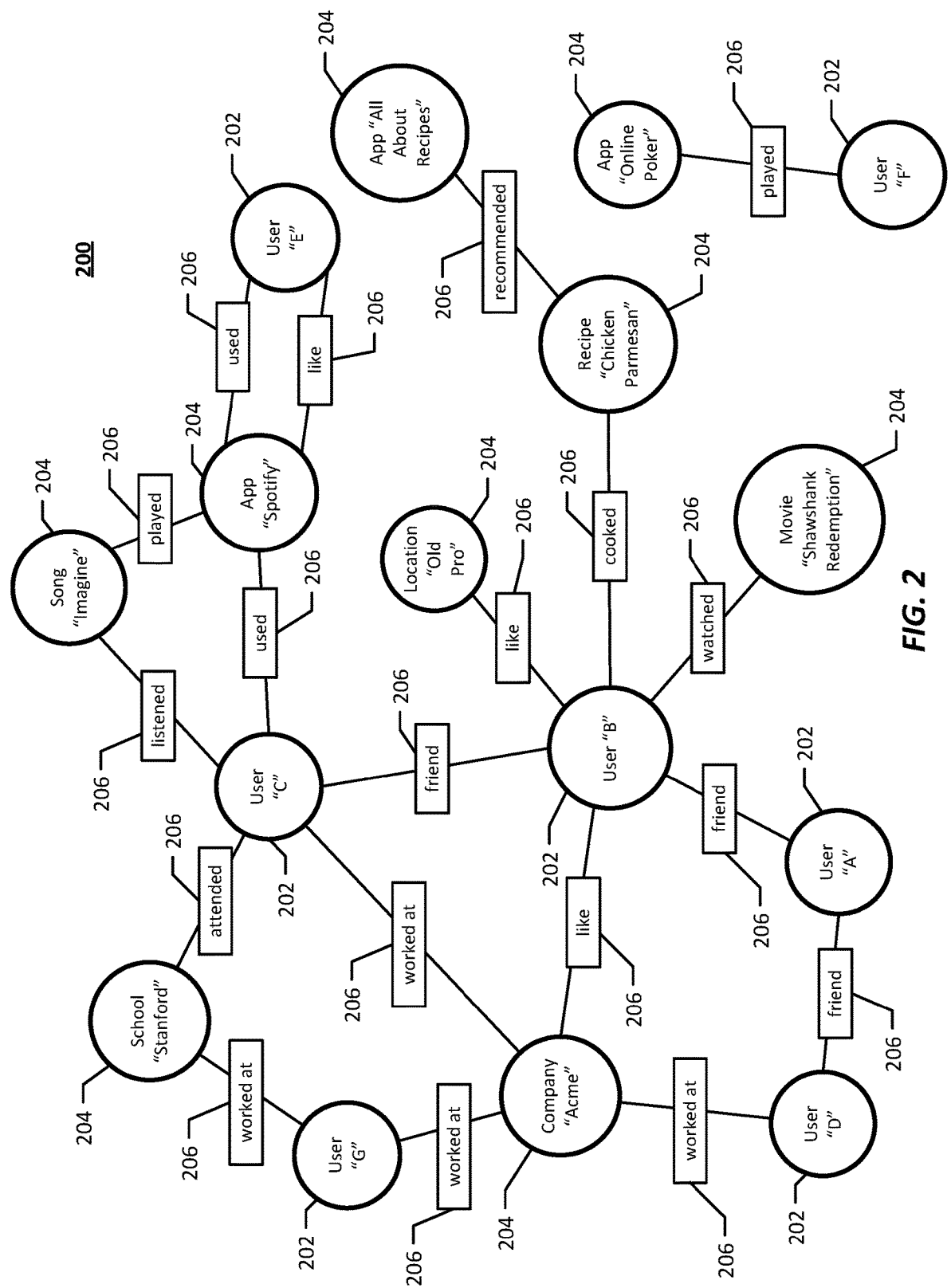
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Searching for Ideograms

Particular embodiments provide ideogram suggestions in response to a textual query inputted by a user at a client system. A query may be any text string inputted by a user at a client system or otherwise generated by a user, the text string made up of one or more n-grams. As used herein, n-grams may be words or groups of words, any part of speech, punctuation marks (e.g., "!"), colloquialisms (e.g., "go nuts"), acronyms (e.g., "BRB"), abbreviations (e.g., "mgmt."), exclamations ("ugh"), alphanumeric characters, symbols, written characters, accent marks, or any combination thereof. Ideograms may be written characters, symbols, or images, which each may represent an idea or thing with or without using letters or words. Ideograms may be animated or static. For example, ideograms may include a surfing dog image, a laughing character gif, or an image of a glazed donut. A group of ideograms may be presented as a collection of digital images, which may be referred to as a sticker pack. A sticker pack may include, as an example and not by way of limitation, a group of ideograms sharing a common theme, style, or character, and may be displayed in a user interface enabling the user to select ideograms to be inserted into the text. In particular embodiments, each of the ideograms in a sticker pack may feature the same character, e.g., a fox character, and each ideogram of the sticker pack may depict the fox character in a different state. For example, the fox may be depicted as engaged in an activity, e.g., the fox jogging, the fox positioned with one or more props, e.g., a crown and scepter, the fox shown in a particular environment or setting, e.g., the fox at a beach, or embodying a particular mood or emotion, e.g., the fox appearing scared. Although this disclosure describes providing particular ideograms in a particular manner, this disclosure contemplates providing any suitable ideograms in any suitable manner.

In particular embodiments, a set of suggested ideograms may be generated based on the received user-inputted query, and delivered to the user for selection of one or more ideograms. The suggested ideograms may be provided in response to a query from the user. As an example and not by way of limitation, a user may select one more of the suggested ideograms for inclusion in a post, status update, private message, or other suitable content associated with an online social-networking system. In particular embodiments, suggested ideograms are ranked and presented to the user according to the rankings. As an example and not by way of limitation, suggested ideograms may be ranked based on popularity, user preferences, and/or usage history. As another example and not by way of limitation, only a certain number of the ideogram suggestions having the highest determined rankings are delivered to the user.

In particular embodiments, in response to receiving a user-inputted query, a set of suggested ideograms is generated and displayed to the user. In particular embodiments, the manner in which ideogram suggestions are presented to a user may vary based on the context in which the query was inputted. As an example and not by way of limitation, a query may be inputted as part of a conversation or as parameters in a search for ideograms. In another example, a user may input a query at a text entry field of a messaging platform, as described below in connection with FIG. 3A, or a user may input a query at a search field of a messaging platform, as described below in connection with FIG. 3B, and the manner in which the ideogram suggestions are displayed or provided to the user may differ in each example, as described in further detail below.

Figure 3A:
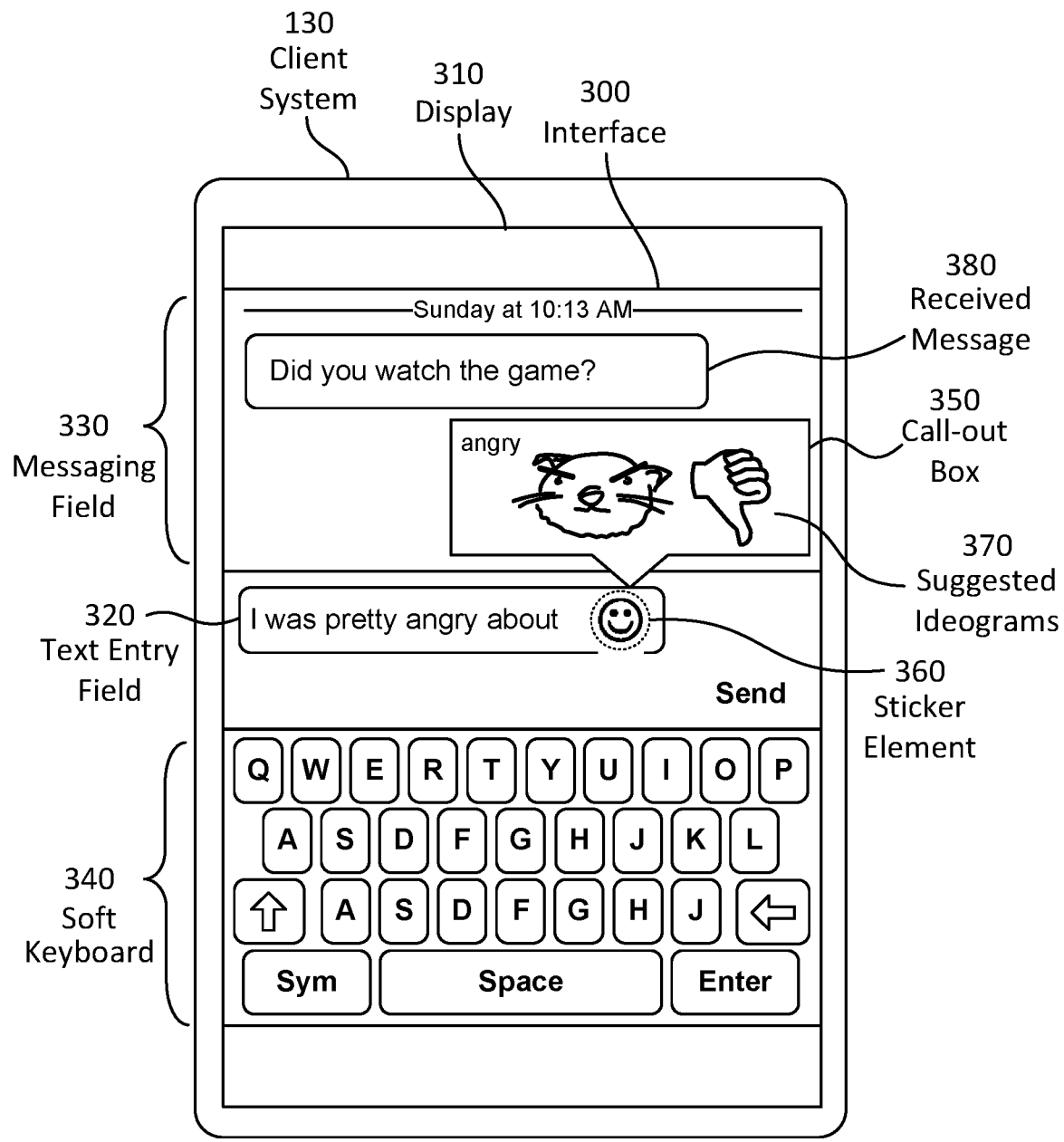
FIG. 3A illustrates an example interface of a messaging platform depicted on a display of a client system.

FIG. 3A illustrates an example interface of a messaging platform depicted on a display of a client system 130. Messaging platform may include text entry field 320 and message field 330. Messaging platform may send and receive textual messages and ideograms and display them within message field 330 to users participating in a conversation on messaging platform. In the example illustrated in FIG. 3A, received message 380—"Did you watch the game?"—is displayed in message field 330 and may be a previously-received message sent from another user. In particular embodiments, as described below in connection with FIG. 6, the messaging platform may determine suggested ideograms 375 based on previously received messages (e.g., received message 380). The messaging platform may receive user-inputted queries at text entry field 320. In particular embodiments, the messaging platform may determine suggested ideograms 375 based on a user query inputted at text entry field 320. A user may input a query using, for example, soft keyboard 340 depicted on display 310 of client system 130. It will be understood that a query may be inputted using any suitable input, including, for example, typing on a keyboard, voice input received at a microphone of client system 130, other suitable input methods, or any combination thereof.

In the example illustrated in FIG. 3A, a query—"I was pretty angry about"—is shown as received input in text entry field 320. In particular embodiments, messaging platform may determine suggested ideograms 370 based on one or more n-grams (e.g., words) of a query inputted at text entry field 320. In the illustrated example of FIG. 3A, in response to the user inputting the query—"I was pretty angry about"—the messaging platform may determine, based on the inputted query, a set of one or more ideograms. As an example and not by way of limitation, suggested ideograms 375 are depicted as including a cartoon cat head with its brow furrowed in anger, eyebrows drawn together, and a thumbs down image.

In particular embodiments, the messaging platform may highlight, change the color of, underline, italicize, or otherwise emphasize a particular n-gram or group of n-grams of a query to indicate to the user that suggested ideograms 370 have been determined or are available for that particular word or n-gram. For example and not by way of limitation, suggested ideograms 370 may be determined based on the word "angry" or the phrase "pretty angry," either or both of which may be emphasized by the messaging platform to indicate available ideograms for the respective word or phrase. In particular embodiments, messaging platform may indicate to a querying user that suggested ideograms 370 have been determined and are available for use by causing a notification element to glow or light up or by emphasizing the notification element in any other suitable manner. As an example and not by way of limitation, in the example illustrated in FIG. 3A, sticker element 360 is shown as glowing, which is depicted by the dashed line encircling sticker element 360. Sticker element 360 may be selectable by a user when displayed without emphasis or embellishment as well as when glowing or otherwise emphasized. As an example and not by way of limitation, in response to user-selection of sticker element 160, the messaging platform may cause call-out box 350 to appear at interface 300, revealing suggested ideograms 370. In particular embodiments, once a user has inputted a full or partial query in text entry field 320, messaging platform may generate and automatically display suggested ideograms 370 to the user on interface 300.

In particular embodiments, messaging platform may provide sticker (i.e., ideogram) search functionality as a frame within a messaging environment of interface 300. As an example and not by way of limitation, a user may request a search tool by selecting an element of interface 300, for example, sticker element 360, when it is not emphasized.

Figure 3B:
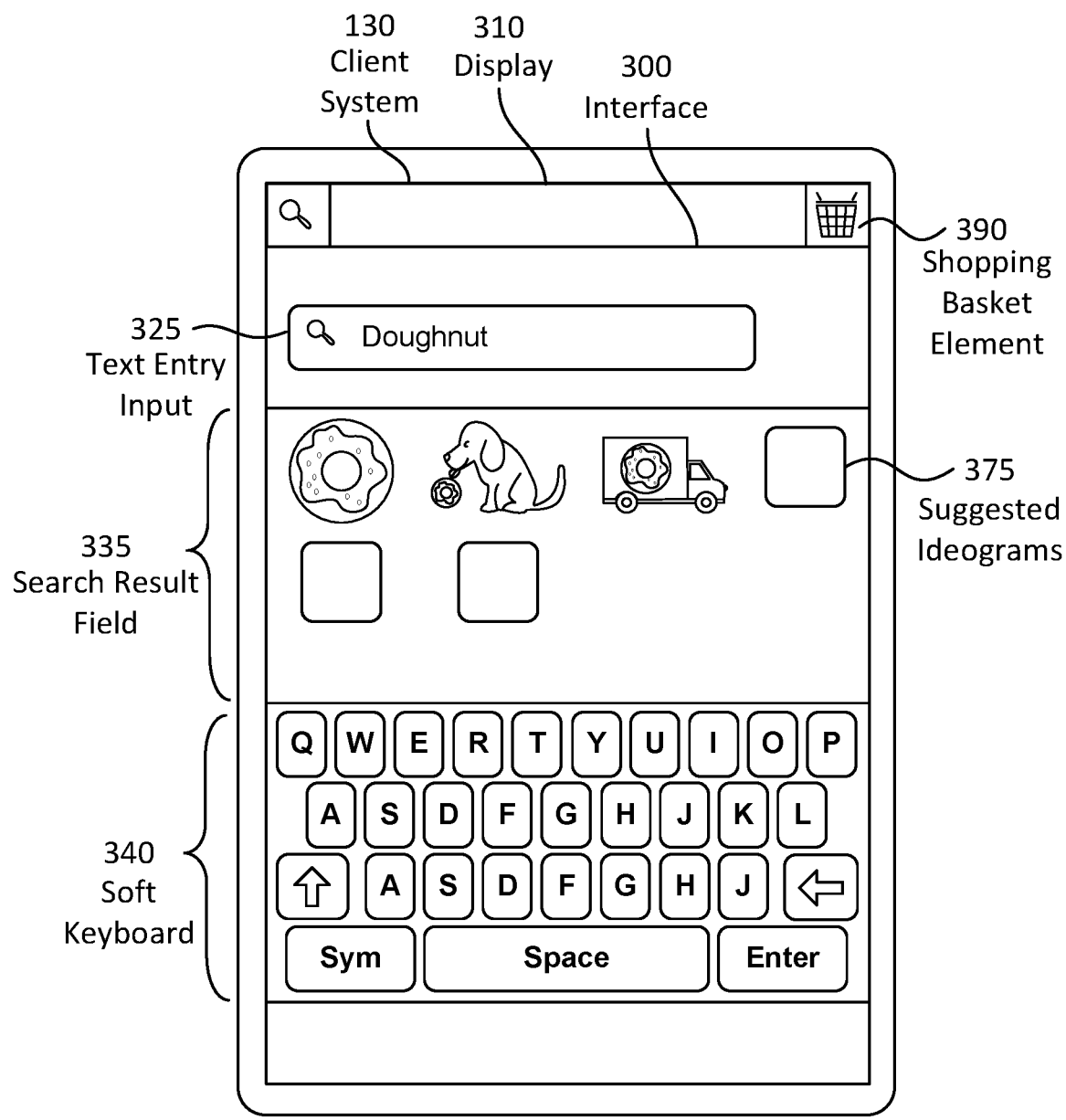
FIG. 3B illustrates an example interface of a messaging platform depicted on a display of a client system.

Messaging platform may present a sticker search tool to the user, as described in FIG. 3B.

FIG. 3B illustrates an example interface 300 of a messaging platform depicted on display 310 of client system 130. Messaging platform may include search field 325 and search result field 335. Messaging platform may determine, retrieve, and provide suggested ideograms 375 in response to a user-inputted query specifying search parameters. In particular embodiments, messaging platform may provide suggested ideograms 375 to a querying user by displaying them within search result field 335. Messaging platform may receive user-inputted queries at search field 325.

In the illustrated example, a query—"doughnut"—is shown as received input in search field 325. In particular embodiments, messaging platform may analyze text entered at search field 325 and generates a set of suggested ideograms 375 based on the analysis. In particular embodiments, once a user has inputted text in search field 325, messaging platform may generate and automatically display suggested ideograms 375 to the user. As an example and not by way of limitation, suggested ideograms 375 are depicted as including an image of a doughnut with rainbow sprinkles, a cartoon dog licking a doughnut, and an image of a delivery truck with a doughnut painted on one side. In particular embodiments, messaging platform may display suggested ideograms 375 in a call-out box (which could be a pop-up window, drop-down menu, box, or other suitable user interface), such as call-out box 350, described above in connection with FIG. 3A.

In particular embodiments, messaging platform may only display suggested ideograms 375 that belong to sticker packs that are available to the user (i.e., purchased, downloaded, or otherwise available). In particular embodiments, messaging platform may display suggested ideograms 375 that belong to sticker packs that are not available to the user (i.e., not purchased, downloaded, or otherwise available). If the user selects an ideogram associated with a sticker pack that is not available, messaging platform may prompt the user to download and/or buy the respective sticker pack before the ideogram may be used. In particular embodiments, suggested ideograms 375 may include the ideograms which are available to the user (e.g., ideograms that belong to sticker packs owned by the user or sticker packs that are free to download), and messaging platform may notify the user that additional ideograms matching the search parameters exist and which may be made available (e.g., by purchase or download of the associated sticker packs) by causing a store element, for example, shopping basket element 375 to glow, light up, or otherwise be emphasized. In another example, messaging platform may cause a jewel notification to appear and persist on shopping basket element 375, and the jewel notification may display a number corresponding to how many ideograms, additional to those displayed as suggested ideograms 375, meet the search criteria and may be purchased or downloaded.

Although this disclosure describes and illustrates particular embodiments of FIGS. 3A-3B as occurring on an interface of a messaging platform and as being implemented by the messaging platform, this disclosure contemplates any suitable embodiments of FIGS. 3A-3B occurring on any suitable interface and as being implemented by any suitable platform or system. As an example, and not by way of limitation, particular embodiments of FIGS. 3A-3B may occur on an interface of social-networking system 160 and be implemented by social-networking system 160. Furthermore, although this disclosure describes and illustrates particular components, devices, or systems carrying out particular steps of the method of FIGS. 3A-3B, this disclosure contemplates any suitable combination of any suitable components, devices, or systems carrying out any suitable steps of the method of FIGS. 3A-3B.

Figure 4:
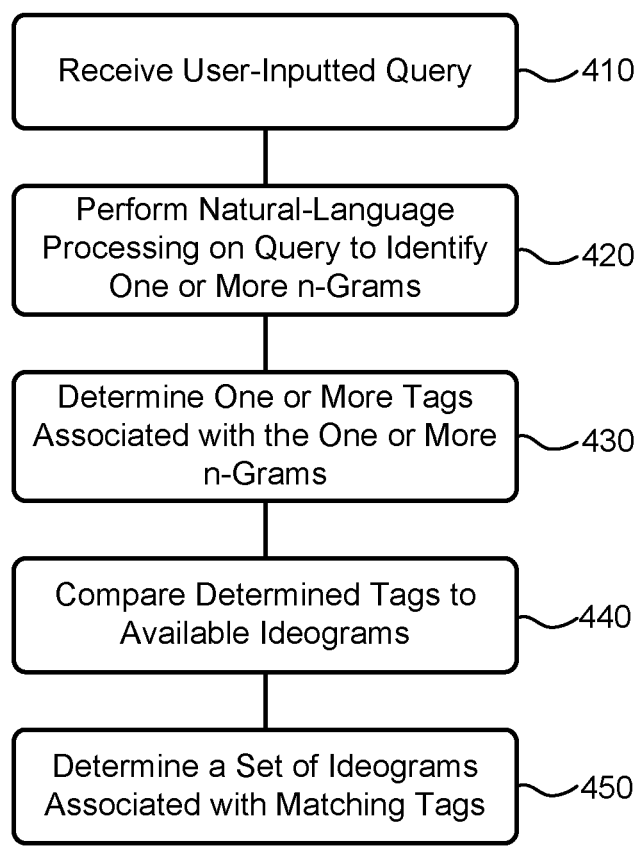
FIG. 4 illustrates an example method for associating one or more n-grams of a query to tags.

FIG. 4 illustrates an example method 400 for matching (or otherwise associating) one or more n-grams of a query to tags. In particular embodiments, a received query is decomposed into constituent n-grams (e.g., words) and the n-grams are mapped to tags, which are in turn mapped to ideograms, as is described further in connection with FIG. 6 below. As an example and not by way of limitation, a messaging platform or a social-networking system, for example, social-networking system 160 of FIG. 1, may determine one or more tags associated with at least one n-gram of a received query.

At step 410, a query inputted by a user at a client system is received. In particular embodiments, a query may be a message sent between two client systems using any of a number of messaging platforms including but not limited to email, Short Messages Service (SMS), or instant message (IM). Queries may also be broadcast by a user to one or more recipient users, e.g., by posting a query as a status update on an online social network, or on a platform like TWITTER. In an example, the query may be inputted by a user at a messaging platform on a client system, for example, a query may be inputted at text entry field 320 or at search field 325.

At step 420, the received query is processed to identify one or more n-grams in the query. In particular embodiments, n-grams and groups of n-grams (e.g., phrases), may be identified and mapped to or associated with tags. Natural-language processing may be used to identify one or more n-grams in the query. For example, a query may be parsed using semantic techniques to identify n-grams that are discrete words or other identifiable groupings of characters. In particular embodiments, n-grams may be identified based on a sentiment or subject being expressed by the particular n-gram or group of n-grams. For example, for the query "I am pretty angry about" received at messaging platform of FIG. 3A, the words "angry" and "pretty angry" may be identified as a result of the natural-language processing. In another example, a compound n-gram may be identified, for example, "happy and proud." In particular embodiments, natural-language processing may be used to reduce n-grams corresponding to inflected or derived words to their respective stems, bases, or roots, which may be referred to herein as stemming. For example, natural-language processing of the user-inputted word "angrier" would determine that "angry" is the root word of "angrier," and subsequent tag analysis may be performed on the identified root word rather than the user-inputted word. In particular embodiments, identified n-grams may include combinations of characters which are recognized, e.g., by the Unicode standard, as corresponding to emoticons. For example, ":)" or its emoticon conversion, ☺, may be identified as an n-gram. In particular embodiments, natural-language processing may not identify any n-grams in a received query. For example, a preposition (e.g., "of"), or an auxiliary verb (e.g., "were"), may not, alone, correspond to any particular sentiment or subject for which a tag association may exist or be determined.

At step 430, one or more tags matching (or otherwise associated with) the one or more identified n-grams are determined. As an example and not by way of limitation, an identified n-gram "angry" may be determined to match tags including "angry," "mad," and/or "agitated" (each of which may be associated with one or more first ideograms), whereas an identified n-gram "very angry" may be determined to match tags including "furious," "rage," and/or "explosive" (each of which may be associated with one or more second ideograms). In another example, the identified n-gram ":)" may be determined to match tags including "happy" and/or "smiling." In another example, the identified n-gram "happy and proud" may be determined to match tags corresponding to both terms "happy" and "proud" and/or to at least one of "happy" or "proud." In another example, the identified n-gram "happy and proud" may be determined to match tags corresponding to both terms "happy" and "proud," whereas the identified n-gram "happy or proud" may be determined to match tags corresponding to both or either of "happy" and "proud." In particular embodiments, n-grams may be dynamically associated with tags. In particular embodiments, a platform or application at which the query is inputted may retrieve predetermined associations from a data store 162 of a social-networking system 160. As an example and not by way of limitation, upon receipt of a user query at text entry field 320, messaging platform may access data store 164, which may store predetermined associations between tags and n-grams, via server 162 of social-networking system 160. In particular embodiments, tags may be stored in association with matching n-grams locally on a client system of the user, e.g., client system 130.

In particular embodiments, tags may be associated with n-grams based on sentiment analysis, including, for example: polarity classification, sentiment classification according to a pre-defined set of emotional states, subjectivity/objectivity identification, feature/aspect-based sentiment analysis, other suitable types of sentiment analysis, or any combination thereof. Sentiment analysis may be based on indicia other than words, punctuation, and ideogram usage, including, for example, analysis of audio including a voice to detect volume, tone, and/or inflection, analysis of video to perform facial/gesture recognition and emotion detection, or analysis of biometric sensor data to detect pulse, temperature, skin conductance, pressure and/or speed while typing/clicking on a touchscreen, and/or pupil constriction/dilation.

At step 440, the matching tags determined at step 430 are compared to available ideograms. As is described in further detail below in connection with FIG. 6, ideograms are separately mapped to tags based on the content of each ideogram, including, but not limited to, the subject and emotion portrayed in the ideogram. In particular embodiments, the matching tags are compared to sticker packs of ideograms to which the querying user has access. As an example and not by way of limitation, a user may have access to any sticker packs she has purchased or downloaded, sticker packs that are publically available, sticker packs that have been gifted to the user, or any other sticker packs that are otherwise available to the user. In another example, matching tags may be compared to sticker packs of ideograms to which the user has access to view but not to use, e.g., a sticker pack that the user has not yet downloaded, but which is available to the user for purchase.

Individual ideograms and sets of ideograms (i.e., sticker packs) may be restricted with respect to use by or visibility to a user. An ideogram may be restricted only in use; for example, an unauthorized user may be prevented from selecting a restricted, yet visible ideogram to send as a message to another user via a messaging platform such as messaging platform of FIG. 3A. An ideogram may additionally be restricted in visibility; for example, an unauthorized user may be restricted from viewing the ideogram. In particular embodiments, matched tags may be compared only to ideograms and sticker packs of ideograms to which a user is fully authorized to view and to use. In particular embodiments, matched tags may be compared to ideograms and sticker packs of ideograms to which a user is at least authorized to view. For example, matching tags may be compared to all ideograms that are visible to a user, including those which the user is authorized to use and those which the user is not authorized to use.

Authorization to use or view a particular ideogram or set of ideograms may be based on conditions set by the creator of the respective ideogram or set of ideograms or by another entity. A restrictive condition on access to certain ideograms may include membership in a specified group. For example, authorized group members may include, by example and not by way of limitation: members of a certain social club; users who have purchased access rights to the particular ideogram or set of ideograms; direct connections of a particular user node or concept node of a social network; users having phone numbers with a certain area code or prefix; registered users of a downloaded mobile device application, other suitable conditions, or any combination thereof. Restrictions to access may additionally be based on user-specific information, including but not limited to: demographic attributes of the user (e.g., age, gender, nationality, cultural background, and/or locality); profile attributes of the user on a social-networking system; a status of the client system (e.g., the device is in "pairing mode" or "game mode"); parental controls set for an account of the user with a social-networking system; a transaction history of the user; other suitable user-specific information; or any combination thereof. In an example, authorization may be granted to users having a transaction history showing greater than a threshold number of games played on a social-networking system; achievement of a threshold level within a particular game; or greater than a threshold number of hours logged playing a particular game; achievement of greater than a threshold number of posts (e.g., comments or status updates); or designation as an administrator or officer of an organization or group.

At step 450, a set of ideograms are determined based on the comparison in step 440. For example, a determined set of ideograms may correspond to suggested ideograms 370 of FIG. 3A or suggested ideograms 375 of FIG. 3B. In particular embodiments, the set of ideograms determined may include only ideograms from sticker packs to which a user is fully authorized to view and to use. In particular embodiments, the set of ideograms determined may include only ideograms from sticker packs to which a user is at least authorized to view. In particular embodiments, the set of ideograms is determined based on user preferences. User preferences may include, for example and not by way of limitation, parental controls, whether or not certain restricted ideograms should be included, preferred and disfavored sticker packs and categories of ideograms, and usage history for the particular user.

Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for associating one or more n-grams of a query to tags, including the particular steps of the method of FIG. 4, this disclosure contemplates any suitable method for determining a set of ideograms for a received query including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5A:
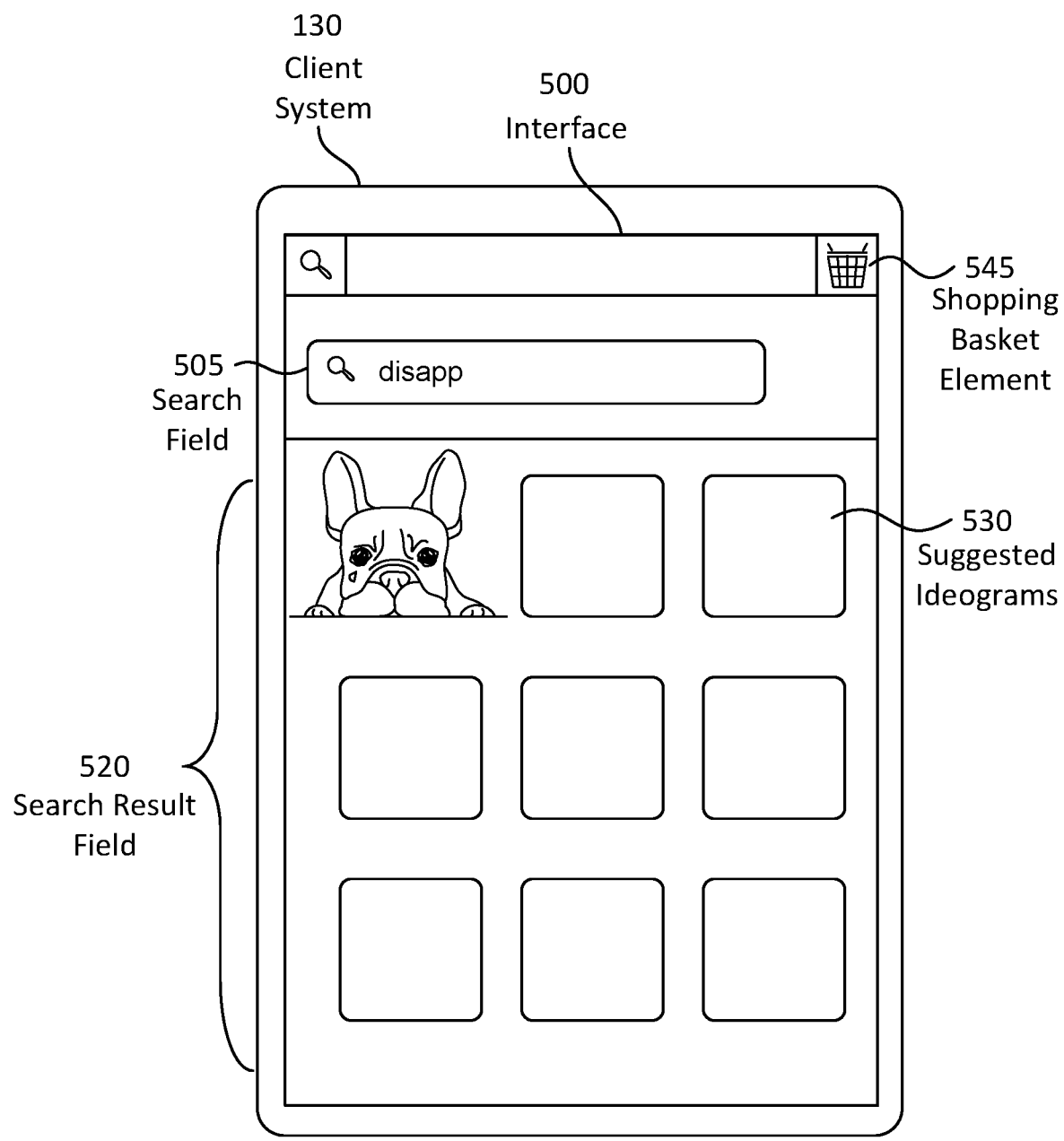
FIG. 5A illustrates an example set of suggested ideograms provided in response to a partial query received at an interface of a messaging platform depicted on a display of a client system.

FIG. 5A illustrates an example set of suggested ideograms 530 provided in response to a partial query received at an interface 500 of a messaging platform depicted on a display of a client system 130. Interface 500 may include search field 505 and search result field 520. In particular embodiments, the messaging platform may determine, retrieve, and provide suggested ideograms 530 in response to a partially-inputted query. In the example illustrated in FIG. 5A, the query inputted at search field 505—"disapp"—is a partial query. In particular embodiments, a partial query may be a group of words, one or more of which are incomplete, and the messaging platform may determine tags associated with the one or more incomplete words as well as tags associated with any number of the complete words. The messaging platform may dynamically process text as it is entered or received and may generate suggested ideograms 530 based on the text that has been inputted (for example, using a typeahead-like functionality, as described in U.S. patent application Ser. No. 12/763,171, filed 19 Apr. 2010, issued as U.S. Pat. No. 8,244,848 on 14 Aug. 2012, which is incorporated by reference herein). In particular embodiments, the messaging platform generates suggested ideograms 530 based on a prediction as to what root word, or derivative thereof, a partial query corresponds. In the example illustrated in FIG. 5A, the messaging platform may identify the n-gram "disappointed" based on a natural-language processing analysis of the partial query "disapp" inputted at search field 505. The messaging platform may determine that the identified n-gram "disappointed" matches tags "sad" and "disappointed." The messaging platform may additionally retrieve synonyms of "disappointed" from a third party source and determine tags based on the retrieved synonyms. The messaging platform may then determine a set of suggested ideograms 530 based on a comparison of the matching tags and available ideograms. Each of suggested ideograms 530 may represent an expression of disappointment or sadness and may include, as an example and not by way of limitation, a sad French Bulldog cartoon shedding a tear. The messaging platform may provide suggested ideograms 530 to a querying user by displaying them within search result field 520. The messaging platform may notify the user that additional ideograms for the matching tags are available for purchase by causing shopping basket element 545 to glow, light up, or otherwise be emphasized. Queries for which few or no suggested ideograms 530 are generated may be logged and used to develop new ideograms and sticker packs associated with tags matching n-grams of these queries.

Figure 5B:
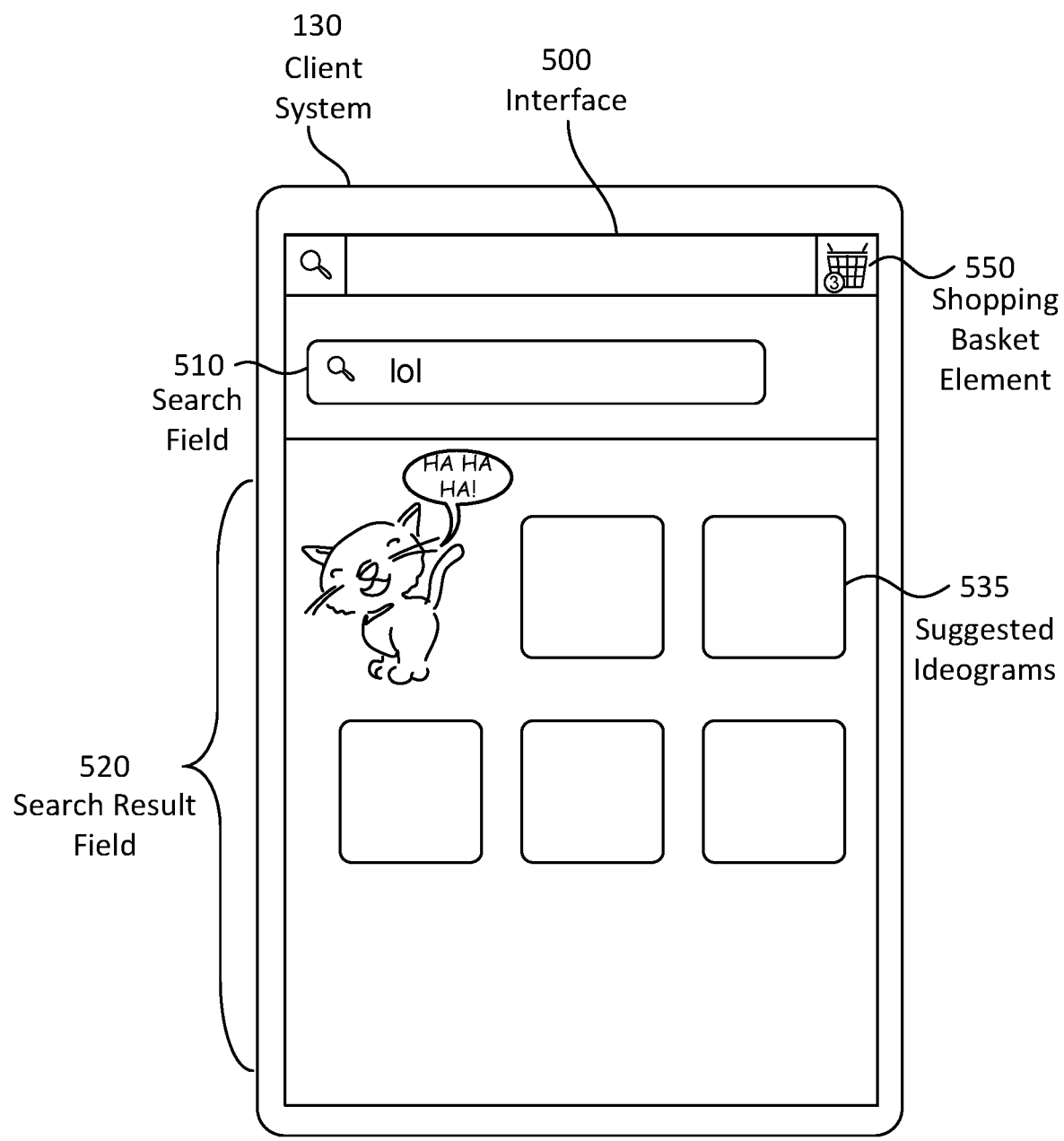
FIG. 5B illustrates an example set of suggested ideograms provided in response to a query received at an interface of a messaging platform depicted on a display of a client system.

FIG. 5B illustrates an example set of suggested ideograms 535 provided in response to a query received at an interface 500 of a messaging platform depicted on a display of a client system 130. Interface 500 may include search field 510 and search result field 520. In particular embodiments, the messaging platform may determine, retrieve, and provide suggested ideograms 535 in response to a query that is an acronym or abbreviation. In the example illustrated in FIG. 5B, the query inputted at search field 510 is the acronym "lol," which is used to express "laugh out loud" in text communications. In particular embodiments, the messaging platform may determine tags associated with the acronym (e.g., "lol") and/or with the individual words implicit in or represented by the acronym (e.g., "laugh out loud"). In particular embodiments, the messaging platform generates suggested ideograms 535 based on an acronym that is unique to a particular user; as an example and not by way of limitation, the messaging platform may dynamically develop a personalized vocabulary based on the user's text and ideogram usage histories. The messaging platform may provide suggested ideograms 535 to a querying user by displaying them within search result field 520. Each of suggested ideograms 535 may represent an expression of laughter or happiness and may include, as an example and not by way of limitation, a laughing cat depicted with a call-out bubble that reads "HA HA HA!" The messaging platform may notify the user that additional ideograms are available for purchase or download by causing shopping basket element 550 to glow, light up, or otherwise be emphasized. The messaging platform may also cause a jewel notification to appear and persist on shopping basket element 550, corresponding to a number of ideograms, shown as "3" in the example illustrated in FIG. 5B, in addition to those displayed, which meet the search criteria and are available for purchase and/or download.

Figure 5C:
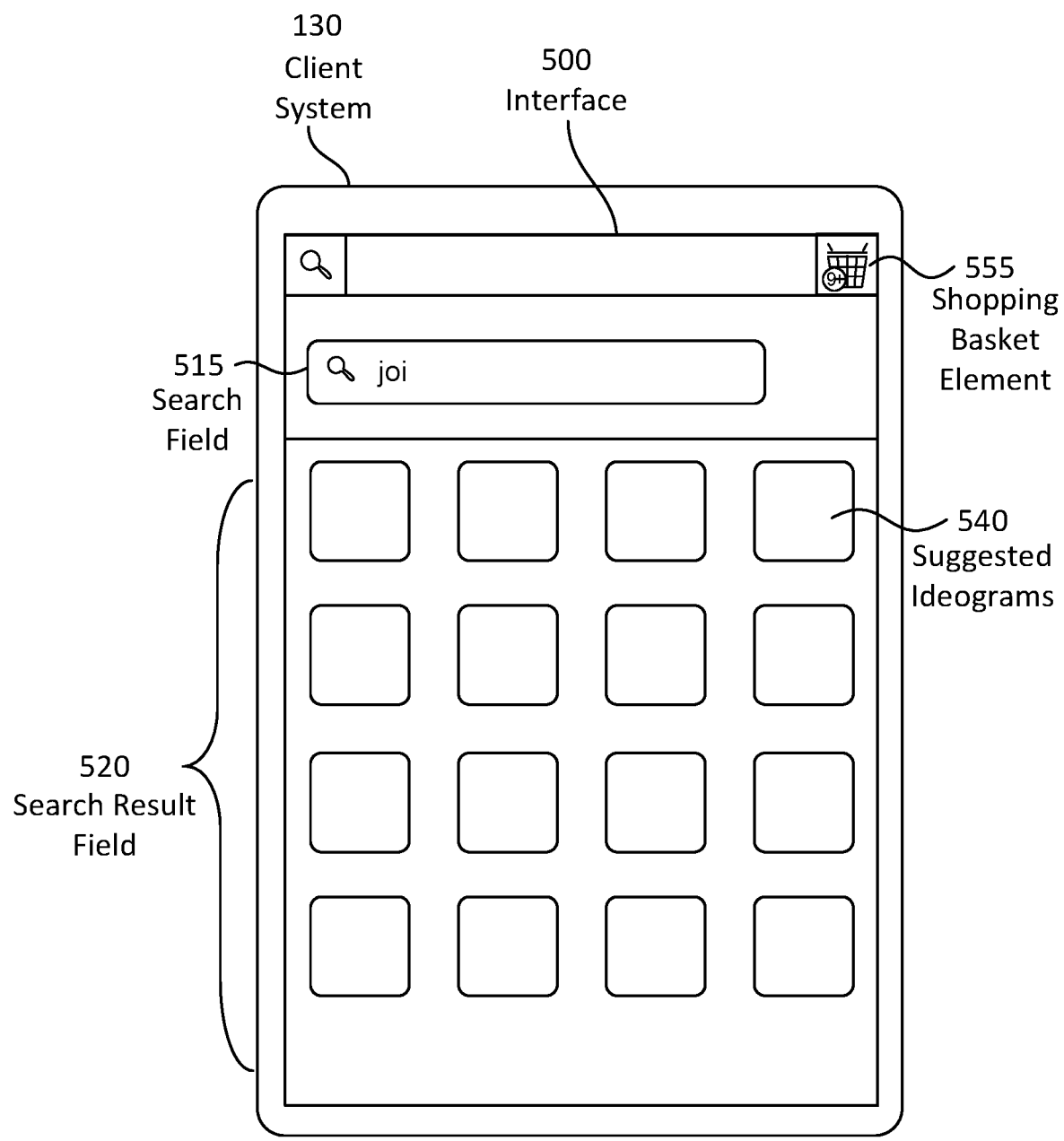
FIG. 5C illustrates an example set of suggested ideograms provided in response to a misspelled query received at an interface of a messaging platform depicted on a display of a client system.

FIG. 5C illustrates an example set of suggested ideograms 540 provided in response to a misspelled query received at an interface 500 of a messaging platform depicted on a display of a client system 130. Interface 500 may include search field 515 and search result field 520. In particular embodiments, the messaging platform may determine, retrieve, and provide suggested ideograms 540 in response to a partially-inputted query. In the example illustrated in FIG. 5C, the query inputted at search field 515 is a misspelled word, "joi." In particular embodiments, a query may be a group of words, one or more of which are misspelled, and the messaging platform may determine tags associated with the one or more misspelled words as well as tags associated with any number of the correctly spelled words. In particular embodiments, the messaging platform may generate suggested ideograms 540 based on a prediction as to what correctly spelled word a misspelled n-gram corresponds. In the example illustrated in FIG. 5C, the messaging platform may identify the n-gram "joy" based on a natural-language processing analysis of the query "joi" inputted at search field 515. The messaging platform may determine and provide suggested ideograms 540 to a querying user by displaying them within search result field 520. Each of suggested ideograms 540 may represent an expression of joy or happiness and may include, as an example and not by way of limitation, two characters dancing together sporting gleeful expressions. The messaging platform may notify the user that additional ideograms are available for purchase or download by causing shopping basket element 555 to glow, light up, or otherwise be emphasized. The messaging platform may also cause a jewel notification to appear and persist on shopping basket element 555 corresponding to a number of ideograms, shown as "9+" in the example illustrated in FIG. 5C, in addition to those displayed, which meet the search criteria and are available for purchase and/or download.

Although this disclosure describes and illustrates particular embodiments of FIGS. 5A-5C as occurring on an interface of a messaging platform and as being implemented by the messaging platform, this disclosure contemplates any suitable embodiments of FIGS. 5A-5C occurring on any suitable interface and as being implemented by any suitable platform or system. As an example, and not by way of limitation, particular embodiments of FIGS. 5A-5C may occur on an interface of social-networking system 160 and be implemented by social-networking system 160. Furthermore, although this disclosure describes and illustrates particular components, devices, or systems carrying out particular steps of the method of FIGS. 5A-5C, this disclosure contemplates any suitable combination of any suitable components, devices, or systems carrying out any suitable steps of the method of FIGS. 5A-5C.

Figure 6:
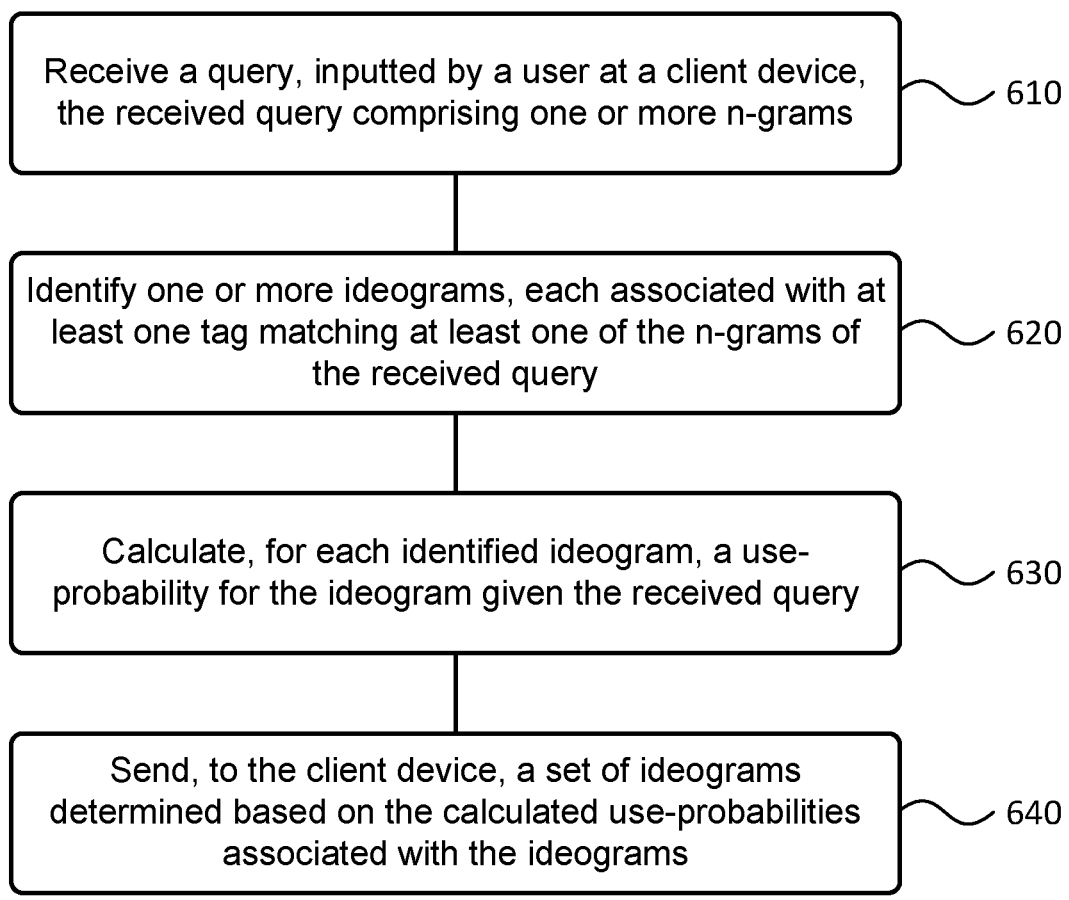
FIG. 6 illustrates an example method for determining a set of ideograms for a received query.

FIG. 6 illustrates an example method 600 for determining a set of ideograms for a received query. As described above, queries may be distilled into identified n-grams, which are matched to tags. Each ideogram may also be associated with one or more tags, and ideograms associated with the matched tags may be identified as candidates for inclusion in a set of suggested ideograms.

At step 610, a query is received at a client system of a user of an online social network, the query being inputted by the user at the client system. The may query be composed of one or more n-grams. In particular embodiments, step 610 may correspond to step 410 of FIG. 4. As described above, a query may be inputted, as an example and not by way of limitation, at a messaging platform (e.g., messaging platform of FIG. 3A), a messaging platform (e.g., messaging platform of FIG. 3B), at an interface of an online social-networking system, or at any other suitable platform or system.

At step 620, one or more ideograms are identified, each ideogram being associated with one or more tags, each identified ideogram being associated with at least one tag matching at least one of the n-grams of the received first query. As described above, tags are determined to be associated with identified n-grams of a user-inputted query at step 430 of FIG. 4. In particular embodiments, the one or more ideograms may be identified based on tag associations that have previously been determined. That is, each ideogram may already be mapped to tags before analysis of a query begins. For example, ideograms may be manually mapped to or associated with tags at inception by the respective sticker pack creators to which the ideograms belong. In this manner, step 620 may not involve any mapping of tags to ideograms, but rather, the mapping may already be completed, as described below.

Each ideogram may be mapped to one or more tags. Ideograms may be identified based on an association with at least one tag that is mapped to an n-gram of the query received at step 610. In particular embodiments, ideograms may be mapped to tags based on categories. That is, each ideogram may be associated with one or more categories (e.g., emotions, actions, sensations, objects, exclamations, and emoticons), and tags may be identified as being associated with each ideogram based on the categories associated with the ideogram. As an example and not by way of limitation, an ideogram may be a grimacing potato character depicted as jumping on a sizzling surface. The potato character may be mapped to "jump" or "bounce" in the action category, to "hot" and "burn" in the sensation category, and to "hot potato," "potato," and "vegetable" in the object category.

In particular embodiments, ideograms are dynamically mapped to or associated with tags based on machine learning. This machine learning may be based on any suitable input, including, for example, ideogram-use history of one or more users (e.g., words in messages sent or received in a conversation in which one or more ideograms are also sent or received); sentiment analysis of one or more users (e.g., analysis of sentiment or emotion expressed in messages sent or received in a conversation in which one or more ideograms are also sent or received); pertinent information from third-party sources (e.g., a thesaurus providing information that two tags are synonymous in meaning and can be mapped to the same ideogram); natural-language processing of text (e.g., stemming analysis as described above); textual analysis using a Bayesian network; dialogue analysis (e.g., analysis of reaction and punctuation stickers as described below); any other suitable input; or any combination thereof. How and when a particular user employs particular ideograms may be logged and analyzed to determine and associate appropriate tags with ideograms based on the particular user's ideogram use history. As an example and not by way of limitation, a machine-learning system may learn, over time, that a user tends to send a particular ideogram for a particular query and may associate the particular ideogram with tags that match n-grams in the particular query. As an example and not by way of limitation, ideograms may be mapped to tags based on crowd-sourced information, including, for example, the use history of social connections of the user or a plurality of other users of a social-networking system such as social-networking system 160.

Because ideograms may be used to respond to messages (i.e., reaction stickers) and to punctuate a conversation (i.e., punctuation stickers), a machine-learning system may separately analyze reaction stickers and punctuation stickers in mapping ideograms to tags. As an example and not by way of limitation, a user may be running late and may send an "I'm late" sticker to a recipient user (i.e., punctuation sticker), whereas the recipient user may send a frowning face sticker in response (i.e., reaction sticker). In particular embodiments, ideograms may be mapped to tags based on n-grams identified in an earlier message received from another user of an online social network participating in a conversation with the user, for example, on a messaging platform, e.g., messaging platform 320 of FIG. 3A.

In particular embodiments, a second query is received, before the receipt of the query at step 610, from a second client system of a second user of the online social network, the second query inputted by the second user at the second client system, the second query made up of one or more n-grams. One or more ideograms may be identified, each ideogram associated with at least one tag matching at least one of the n-grams of the received second query. The n-grams of the second query may be identified and analyzed as described above in connection with FIG. 4, so as to determine the tags associated with or matching the n-grams of the second query. In particular embodiments, the second user may be connected to the user within a social graph of the online social-networking system by a threshold degree of separation. For example, the threshold degree of separation may be one, two, three, or all.

At step 630, for each identified ideogram, a use-probability is calculated for the ideogram given the query received at step 610. In particular embodiments, the use-probability is based at least in part on a frequency of use associated with the ideogram.

In particular embodiments, one or more of the tags associated with a particular ideogram are dynamically generated using machine learning based on the frequency of use of the ideogram by one or more users of the online social network. In particular embodiments, the frequency of use is determined for a plurality of users of the online social network. In particular embodiments, the frequency of use is determined for the user. In particular embodiments, the frequency of use is determined for social connections of the user. In particular embodiments, the frequency of use is determined for a user participating in a conversation with the user, for example on messaging platform of FIG. 3A.

In particular embodiments, ideograms are dynamically ranked based on the popularity of each ideogram. Popularity may be determined as a frequency of use. Frequency of use may be determined as a probability relative to an individual user and/or relative to a group of users of an online social-networking system, which may include, for example, social connections of the user, users located within a same region as the user, users having similar demographics to the user, or any other suitable group of users. Frequency of use may be also be determined for a particular query (i.e., the probability of an ideogram/sticker being sent for a particular query). Given a sticker s and a query q, the probability of s given q, denoted as P(s|q), is computed as:

$$P(s\mid q) = \frac{P(q\mid s) \cdot P(s)}{P(q)} = P(q\mid s) \cdot P(s) \quad [1]$$

where $$P(q\mid s) = \frac{\text{number of times } s \text{ was sent for } q}{\text{number of time } s \text{ was sent for any query}}, \quad [2]$$

and $$P(s) = \frac{\text{number of times } s \text{ was sent}}{\text{number of times any sticker was sent}}. \quad [3]$$

In particular embodiments, a Bayesian Network, or any other suitable probabilistic graphical model or statistical model, may be used in determining a set of one or more ideograms for a given query. Random variables may be defined, each corresponding to ideograms (i.e., stickers), tags, and queries. For example, S may be a multi-valued random variable, the domain of which is all searchable stickers (i.e., ideograms); T may be a multi-valued random variable, the domain of which is all tags that are associated with searchable stickers; and Q may be a multi-valued random variable, the domain of which is all suitable queries (i.e., one or more n-grams). The domain of the multi-valued random variable Q may be, for example, all text strings that are valid input, limited by length, and excluding particular special characters (e.g., special characters that are not alphanumeric characters or punctuation marks). The network structure may imply that S is independent (i.e., statistically independent or stochastically independent) of Q given T, denoted as (Q|T). In necessarily follows that S is uncorrelated and thus orthogonal to (Q|T), which may be denoted as (S⊥Q|T). Given random variables S, T, and Q, an ideogram having the highest probability for a given query, denoted as $$\max_{s,t} P(S, T\mid Q),$$

may be computed as:

$$\max_{s,t} P(S, T\mid Q) = \max_{s,t} \frac{P(S, T, Q)}{P(Q)} \quad [4]$$

$$= \max_{s,t} \frac{P(Q\mid T, S) \cdot P(T\mid S) \cdot P(S)}{P(Q)} \quad [5]$$

$$= \max_{s,t} P(Q\mid T, S) \cdot P(T\mid S) \cdot P(S), \quad [6]$$

where equation [5] is equivalent to equation [6] because (S⊥Q|T), and P(Q) is the same for all possible s, t.

In equation [6], P(Q|T) may be an error model representing how likely it is that the user would input a query q when the user intended or wanted a tag t. P(Q|T) may be estimated using prefix matching and edit distance. Models may be trained for particular device and keyboard combinations to take into account common typographical errors resulting from, for example, inadvertently pressing an adjacent key on a particular keyboard of a particular device. For example:

$$P(Q\text{=``ha''}\mid T\text{=``ha''}) > P(Q\text{=``ha''}\mid T\text{=``happy''}) > P(Q\text{=``ha''}\mid T\text{=``hi''}) > (Q\text{=``ha''}\mid T\text{=``no''}) \quad [7]$$

In equation [6], P(T|S) may be a tag model representing how well a tag t corresponds to a sticker s or how likely a tag t is given a desired sticker s. Given a tag t*, which is the tag that maximizes the expression P(S,T|Q), P(T|S) may be estimated as:

$$P(T\mid S) = \frac{\text{number of times } s \text{ was sent for } t^*}{\text{number of times } s \text{ was sent for any query}}. \quad [8]$$

Also in equation [6], P(S) may be a sticker model representing the popularity of a sticker s or the likelihood that a querying user desires sticker s given no other information. P(S) may be estimated as:

$$P(S) = \frac{\text{number of times } s \text{ was sent}}{\text{number of times any sticker was sent}}. \quad [9]$$

At step 640, the set of ideograms, including one or more of the ideograms each associated with tags matched to identified n-grams of a query, may be sent to a client system 130 for display to the user. In particular embodiments, a set of ideograms is displayed on a user interface of a native application associated with an online social network. In particular embodiments, a set of ideograms is displayed on a webpage of an online social network accessed by a browser client of client system 130. The set of ideograms may be presented to the user as suggestions, and each of the set of ideograms may be selectable by the user. The user may select an ideogram of the suggested ideograms to use or send. As an example and not by way of limitation, the user's selected ideogram may be inserted into a conversation with another user over a messaging platform such as the messaging platform described in connection with FIG. 3A. As another example and not by way of limitation, the user's selected ideogram may be inserted into a post or status update and In particular embodiments, the set of ideograms is determined based on the use-probabilities calculated at step 630. In particular embodiments, each ideogram determined to be associated with matching tags may be ranked based on the calculated use-probabilities, and a set of ideograms may be determined based on the rankings. In particular embodiments, the set of ideograms may be sent to client system 130 for display as an ordered list based on the rankings. The set of ideograms may be presented, for example, in order of ascending or descending rankings or use-probabilities (e.g., a user can toggle between a "normal" view mode, which may present the set of ideograms in descending order, and a "wacky" viewing mode, which may present the set of ideograms in ascending order).

In particular embodiments, ideograms may be determined and/or ranked based on one or more attributes of the user, social connections of the user, or a plurality of other users of a social-networking system. As an example, and not by way of limitation, attributes of the user may be one or more of age, gender, cultural background, country of birth, current location, languages spoken, occupation, any other suitable demographic information, preferences, usage history, or any combination thereof. As an example and not by way of limitation, certain ideograms may be more popular among users of a certain age range, and, for a user in that age range, those ideograms may be ranked higher as it may be determined that it is highly probable that the user will select one of these particular ideograms based on his age (e.g., an ideogram relating to the concept of "YOLO" may be promoted in the rankings of ideograms for users aged 13-18). As another example and not by way of limitation, a user located in a particular country may be sent a set of ideograms in which popularity within his country has been factored into the ranking (e.g., an ideogram caricature of Sylvio Berlusconi, the prime minister of Italy, may be promoted in the rankings of ideograms for users located in Italy but not for users located in the United States of America). As another example and not by way of limitation, trending ideograms featuring text in a particular language may be promoted in the rankings of users who speak that particular language. In particular embodiments, ideograms may be determined and/or ranked based on a context of the user, for example, a date, time of day, weather, location, season, or any other suitable contexts. For example, a user may enter a query—"I'm tired"—and a user's current context may be nighttime in winter, which may result in an ideogram showing a teddy bear tucked into bed with a snowy scene visible out a window being ranked higher than an ideogram showing a girl in a bikini sleeping on a beach under the sun.

As described above in connection with FIG. 5C, queries including one or more misspelled or mistyped words may be mapped to tags, which, in turn, may be mapped to ideograms. In particular embodiments, a misspelling-probability is calculated, the misspelling-probability corresponding to a probability that at least one of the identified n-grams of a received query corresponds to a different n-gram. In other words, a misspelled or mistyped word in a received query may correspond to a correctly-spelled or correctly-typed word, and a probability is computed to quantify the likelihood that a misspelled or mistyped word has been determined to correspond to the right word (i.e., the word that the user intended to type). For example, the query "joi" received at search entry field 515 of the messaging platform of FIG. 5C may correspond to a misspelling of the n-gram "joy," or it may correspond to a partially-inputted n-gram "join." As an example and not by way of limitation, the misspelling-probability may be computed as $P(Q|T)$ as described above and illustrated in equation [7].

In particular embodiments, for a query including at least one n-gram that may correspond to a different n-gram, ideograms may be ranked based on calculated misspelling-probabilities. In particular embodiments, for a query including at least one n-gram that may correspond to a different n-gram, the set of ideograms may be determined based on a calculated misspelling-probability. For example, the use-probability calculated at step 630, using equation [1], may be adjusted to take into account the misspelling-probability. The set of ideograms may then be determined based on adjusted use-probabilities calculated using adjusted equation [1]. All equations described herein, including equations [1]-[9] are merely illustrative and not presented by way of limitation; it will be understood that any suitable technique for calculating or estimating the above-described probabilities may be used.

Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for determining a set of ideograms for a received query including the particular steps of the method of FIG. 6, this disclosure contemplates any suitable method for determining a set of ideograms for a received query including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee." Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the first querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Systems and Methods

Figure 7:
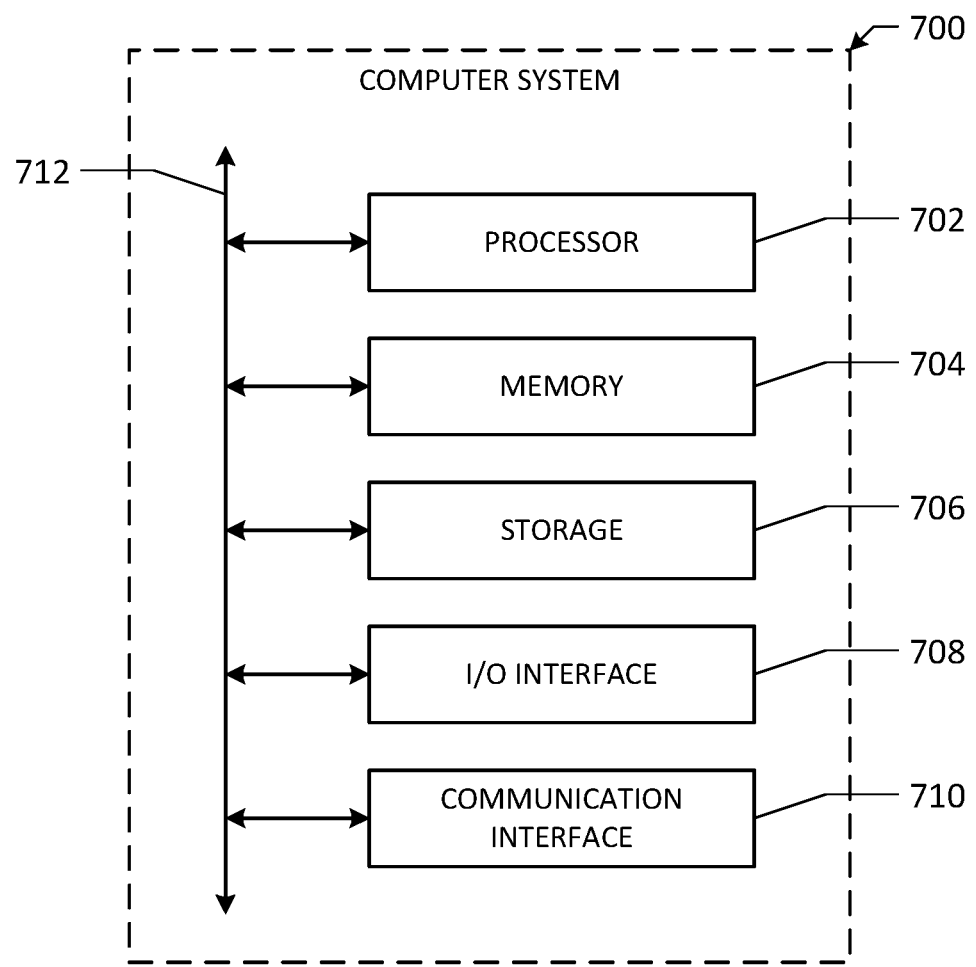
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by a client system of a first user:
   accessing, by the client system responsive to an authorization of the first user, a authorized set of ideograms with a restrictive condition from a plurality of ideograms, wherein the restrictive condition specifies user-specific information required for accessing the authorized set of ideograms, wherein the authorized set of ideograms are determined based on comparing user-specific information associated with the first user against the specified user-specific information in the restrictive condition, wherein the authorized set of ideograms are ranked in an order based on their respective user-probabilities, and wherein each user-probability is calculated based at least in part on a frequency of use associated with the respective ideogram;
   receiving, at the client system, a first query inputted by the first user, wherein the first query comprises one or more n-grams;
   selecting, based on the first query, one or more of the authorized set of ideograms;
   presenting, at the client system, the one or more selected ideograms, wherein the ideograms are presented in ranked order, each ideogram being selectable by the first user; and
   receiving, at the client system, a selection of one of the presented ideograms.

2. The method of claim 1, wherein at least one of the one or more n-grams corresponds to an emoticon.

3. The method of claim 1, wherein the first user is a user of an online social network and wherein the frequency of use is determined for a plurality of users of the online social network.

4. The method of claim 1, wherein the frequency of use is determined with respect to the first user.

5. The method of claim 1, wherein s denotes an ideogram, q denotes the first query, and the use-probability, P(s|q), is computed as:

$$P(s\mid q) = \frac{P(q\mid s)\cdot P(s)}{P(q)} = P(q\mid s)\cdot P(s) \quad [1]$$

wherein $$P(q\mid s) = \frac{\text{number of times } s \text{ was sent for } q}{\text{number of time } s \text{ was sent for any query}}, \quad [2]$$

and $$P(s) = \frac{\text{number of times } s \text{ was sent}}{\text{number of times any sticker was sent}}. \quad [3]$$

6. The method of claim 1, wherein the first user is a user of an online social network, and wherein the online social network comprises a social graph comprising a plurality of nodes and a plurality of edges connecting the nodes, each of the edges between two of the nodes representing a single degree of separation between them, the nodes comprising:
   a first node corresponding to the first user; and
   a plurality of second nodes that each correspond to a second user or a concept associated with the online social network.

7. The method of claim 1, further comprising:
determining one or more tags that match at least one of the one or more n-grams of the received first query based on natural-language processing of the received first query.

8. The method of claim 1, wherein the first query is broadcast by the first user to one or more second users.

9. The method of claim 8, wherein each of the one or more second users is connected to the first user within a social graph by a threshold degree of separation.

10. The method of claim 1, wherein the authorized set of ideograms are ranked in an order further based on their respective calculated misspelling-probabilities, wherein each misspelling-probability indicates that at least one of the one or more n-grams of the received first query corresponds to a different n-gram.

11. The method of claim 1, wherein the authorized set of ideograms are ranked in an order further based on one or more attributes of the first user.

12. The method of claim 11, wherein the one or more attributes comprise age, gender, cultural background, country of birth, current location, languages spoken, occupation, or any combination thereof.

13. The method of claim 7, wherein one or more of the tags matching a particular n-gram are dynamically generated using machine learning based on the frequency of use of the respective ideogram associated with the particular n-gram by one or more users of an online social network.

14. The method of claim 7, wherein one or more of the tags matching a particular n-gram are generated based on sentiment analysis comprising one or more of:
  polarity classification;
  sentiment classification according to a pre-defined set of emotional states;
  subjectivity identification;
  objectivity identification; or
  feature-based sentiment analysis.

15. The method of claim 7, wherein one or more of the tags matching a particular n-gram are generated based on one or more categories associated with the respective ideogram associated with the particular n-gram.

16. The method of claim 1, further comprising:
  receiving a request at the client system to access one or more restricted ideograms, wherein the first user is not authorized to access the restricted ideograms; and
  presenting instructions for purchasing access to the one or more restricted ideograms at the client system to the first user.

17. The method of claim 1, wherein the one or more ideograms are presented on a user interface of a native application associated with an online social network at the client system.

18. The method of claim 1, wherein the one or more selected ideograms are presented on a webpage of an online social network accessed by a browser client of the client system.

19. One or more computer-readable non-transitory storage media embodying software that is operable when executed to:
  access, by the client system responsive to an authorization of the first user, a authorized set of ideograms with a restrictive condition from a plurality of ideograms, wherein the restrictive condition specifies user-specific information required for accessing the authorized set of ideograms, wherein the authorized set of ideograms are determined based on comparing user-specific information associated with the first user against the specified user-specific information in the restrictive condition, wherein the authorized set of ideograms are ranked in an order based on their respective user-probabilities, and wherein each user-probability is calculated based at least in part on a frequency of use associated with the respective ideogram;
  receive, at the client system, a first query inputted by the first user, wherein the first query comprises one or more n-grams;
  select, based on the first query, one or more of the authorized set of ideograms;
  present, at the client system, the one or more selected ideograms, wherein the ideograms are presented in ranked order, each ideogram being selectable by the first user; and
  receive, at the client system, a selection of one of the presented ideograms.

20. A system comprising: one or more processors; and a memory coupled to the processors comprising instructions executable by the processors, the processors being operable when executing the instructions to:
  access, by the client system responsive to an authorization of the first user, a authorized set of ideograms with a restrictive condition from a plurality of ideograms, wherein the restrictive condition specifies user-specific information required for accessing the authorized set of ideograms, wherein the authorized set of ideograms are determined based on comparing user-specific information associated with the first user against the specified user-specific information in the restrictive condition, wherein the authorized set of ideograms are ranked in an order based on their respective user-probabilities, and wherein each user-probability is calculated based at least in part on a frequency of use associated with the respective ideogram;
  receive, at the client system, a first query inputted by the first user, wherein the first query comprises one or more n-grams;
  select, based on the first query, one or more of the authorized set of ideograms;
  present, at the client system, the one or more selected ideograms, wherein the ideograms are presented in ranked order, each ideogram being selectable by the first user; and
  receive, at the client system, a selection of one of the presented ideograms.

* * * * *